United States Patent [19]

Katahira

[11] Patent Number: 4,553,150

[45] Date of Patent: Nov. 12, 1985

[54] DRIVING CIRCUIT FOR AN ELECTROSTATIC RECORDING HEAD

[75] Inventor: Shunsuke Katahira, Hino, Japan

[73] Assignee: Tokyo Shibaura Denki Kabushiki Kaisha, Kawasaki, Japan

[21] Appl. No.: 515,763

[22] Filed: Jul. 21, 1983

[30] Foreign Application Priority Data

Aug. 26, 1982 [JP] Japan .............................. 57-148251

[51] Int. Cl.[4] .............................. G01D 15/06

[52] U.S. Cl. .............................. 346/154; 346/1.1

[58] Field of Search .............................. 346/153.1, 154, 155, 346/1.1; 358/300; 340/753, 754, 799, 802

[56] References Cited

U.S. PATENT DOCUMENTS 3,979,760 9/1976 Tadauchi .............................. 346/154

4,054,885 10/1977 Rothgordt .............................. 346/154

FOREIGN PATENT DOCUMENTS 53-118043 10/1978 Japan .............................. 346/155

55-4048 1/1980 Japan .............................. 346/154

58-158270 9/1983 Japan .

*Primary Examiner*—Thomas H. Tarcza

*Assistant Examiner*—Fred L. Kampe

*Attorney, Agent, or Firm*—Banner, Birch, McKie & Beckett

[57] ABSTRACT

The instant invention relates to a method and apparatus for driving an electrostatic recording head for recording images on a medium comprising a plurality of pin electrodes, the pin electrode arrays are separated into alternate even and odd arrays positioned on said recording head ($A_1$, $B_1$, $A_2$, $B_2$ . . . $A_k$, $B_k$ . . . where $A_k$ are odd arrays and $B_k$ are even arrays), a plurality of control electrodes, each positioned adjacent one or more associated pin electrodes, each pin electrode array and associated control electrodes, when energized, producing the images, the pin and control electrodes are controlled by separate order control circuits which control the pin electrostatic arrays and the control electrode arrays for producing the images in the following order alternating between odd and even arrays:

$A_{N+1}$, $B_1$ . . . $A_{2N}$, $B_N$, $A_1$, $B_{N+1}$, . . . $A_N$, $B_{2N}$, $A_{3N+1}$, $B_{2N+1}$ . . . $A_{4N}$, $B_{3N}$, $A_{2N+1}$, $B_{3N+1}$ . . . $A_{3N}$, $B_{4N}$ wherein N is an integer greater than or equal to 2.

8 Claims, 7 Drawing Figures

DRIVING CIRCUIT FOR AN ELECTROSTATIC RECORDING HEAD

BACKGROUND OF THE INVENTION

1. Field of the Invention

This invention relates to a driving circuit for an electrostatic recording head used in electrostatic recording such as facsimile or other electrostatic recording machines.

2. Description of the Prior Art

A multistylus head 1 having control electrodes $P_1$, $P_2$, $P_3$, . . . , $P'_1$, $P'_2$, $P'_3$, . . . , on the same plane as the recording pin electrodes 3 is shown in FIG. 1; this type of recording head is generally used in electrostatic recording machines. In this type of head 1, a row 3 of a plurality of pin electrodes is disposed on one plane of a base 2. A first and second row of control electrodes $P_1$, $P_2$, $P_3$ . . . and $P_{1'}$, $P_{2'}$, $P_{3'}$. . . are arranged facing each other with pin electrode row 3 therebetween. The second row of control electrodes is positioned opposite the first row in order to create a uniform electric field for recording. Driving circuits are utilized for generating high voltage recording pulses which are coupled to the control and pin electrodes.

FIG. 2 is a conventional driving circuit for an electrostatic recording head. The second row of control electrodes is omitted from the following explanation. It should be noted, however, that each electrode of the second control electrode row is simultaneously impressed with the same voltage as its corresponding control electrode within the first row.

As shown in FIG. 2, the pin electrodes are separated into sequential even and odd arrays, each array consisting of four pin electrodes. As shown, the electrodes form pin electrode arrays $A_1$, $B_1$, . . . , $A_k$, $B_k$, . . . Arrays $A_1$, $A_2$, . . . , $A_k$. . . are odd arrays, while arrays $B_1$, $B_2$, . . . $B_k$ . . . are even arrays. The odd arrays and the even arrays are connected to pin electrode driving circuits 4*a* and 4*b*, respectively. Facing pin electrode arrays $A_1$, $B_1$ are control electrodes $P_1$, $P_2$; $P_2$, $P_3$, facing pin electrodes $A_k$, $B_k$ are control electrodes $P_{2k-1}$, $P_{2k}$; $P_{2k}$, $P_{2k+1}$. The control electrodes are connected to a control electrode driving circuit 5 for energizing the control electrode corresponding to a desired pin electrode.

When recording voltages corresponding to the recording picture signals are impressed on arrays $A_1$, . . . , $A_k$, . . . by pin electrode driving circuit 4*a*, voltages of an opposite polarity are impressed on control electrodes $P_{2k-1}$, $P_{2k}$ by control electrode driving circuit 5. As a result, electrostatic latent images are formed on the recording medium just below the odd array. When voltages corresponding to the recording picture signals are impressed on arrays $B_1$, . . . , $B_k$, . . . by pin electrode driving circuit 4*b*, voltages of an opposite polarity are impressed on control electrodes $P_{2k}$, $P_{2k+1}$ by control electrode driving circuit 5. As a result, electrostatic latent images are formed on the recording medium just below the even array. Various methods of driving multistylus heads which have control electrodes on the same plane can be employed which determine the sequence of recording. As will be discussed, prior art methods provide many disavantages. One prior art method is shown in Table 1.

TABLE 1

| Array of Recording Positions | Voltage Impressed Control Electrodes |
|---|---|
| $A_1$ | $P_1$, $P_2$ |
| $B_1$ | $P_2$, $P_3$ |
| $A_2$ | $P_3$, $P_4$ |
| $B_2$ | $P_4$, $P_5$ |
| . | . |
| . | . |
| . | . |
| $A_{k-1}$ | $P_{2k-3}$, $P_{2k-2}$ |
| $B_{k-1}$ | $P_{2k-2}$, $P_{2k-1}$ |
| $A_k$ | $P_{2k-1}$, $P_{2k}$ |
| $B_k$ | $P_{2k}$, $P_{2k+1}$ |
| . | . |
| . | . |

According to this driving method, voltages are first impressed on both control electrodes $P_1$ and $P_2$, then on both control electrodes $P_2$ and $P_3$ and successively to control electrodes $P_{2k}$ and $P_{2k+1}$. Simultaneously, voltages are alternately impressed on pin electrode arrays $A_1$, $A_2$, . . . , $A_k$, . . . , and $B_1$, $B_2$, . . . , $B_k$, . . . by respective pin electrode driving circuits 4*a* and 4*b*. As a result, recording successively occurs under arrays $A_1$, $A_2$, $B_1$, $B_2$, . . . , $A_k$, $B_k$, . . . .

An equivalent circuit for the pin electrode, control electrode and recording medium is shown in FIG. 3. An H-type circuit is shown wherein the paper has three layers: a dielectric layer facing the pin electrodes, a low resistance layer and a base layer. In FIG. 3, a series circuit consisting of capacitor $C_1$ and resistor $R_2$ exists between the control electrode and ground. Capacitor $C_1$ represents the electrostatic capacitance between the control electrode and the low resistance layer of the recording medium; resistor $R_2$ represents the resistance between the low resistance layer of the recording medium and ground. Furthermore, it is considered that a series circuit consisting of capacitor $C_2$ and resistor $R_3$ exists between the pin electrode and ground. Capacitor $C_2$ represents the electrostatic capacitance between the pin electrode and the low resistance layer of the recording medium; resistor $R_3$ represents the resistance between the low resistance layer of the recording medium and ground. Resistor $R_1$ is connected between node a, which is the connecting point of capacitor $C_1$ and resistor $R_2$, and node b, which is the connecting point of capacitor $C_2$ and resistor $R_3$. Resistor $R_1$ represents the resistance within the low resistance layer existing between the control electrode and the pin electrode. Resistor $R_1$ has a lower resistance value than resistor $R_2$ or resistor $R_3$.

In this circuit, when voltage $V_s$ (+300 V) and voltage Vn (−300 V) are supplied to the control electrode and the pin electrode respectively, the potential at point a will equal $V_a$. When the sum of voltages Vn and $V_a$ exceeds the recording threshold voltage, recording will occur. In the event that voltage $V_s$ is a positive pulse as shown in FIG. 4(A), the potential $V_a$ will vary as shown in FIG. 4(B). That is, at the moment when voltage $V_s$ is supplied to the control electrode, potential $V_a$ will have a maximum value and then gradually diminish as capacitor $C_1$ is charged (see FIG. 4(B)(1). At the time when voltage $V_s$ is no longer supplied to the control electrode, potential $V_a$ will decrease to a negative value. When voltage $V_s$ is again supplied to the same control electrode in order to record under the next array of pin electrodes potential $V_a$ will tend to rise from a slightly negative potential $V_a$ (off) toward the maximum value. This occurs because capacitor $C_1$ has not been completely discharged. Accordingly, the potential at node a will be the maximum value decreased by the value of $V_a(-\text{off})$ (FIG. 4(B)(2)). This produces a change in the recording density of each pin electrode from one moment to another. In addition, a change in recording density is produced among adjacent pin electrodes since the potential of connecting point a corresponding to an adjacent control electrode is not decreased if the voltage is supplied to that control electrode for the first time (see FIG. 4(B)(1)). Consequently, recording density will differ for pin electrodes near the control electrode which receive a supply voltage for the first time (FIG. 4(1)) and pin electrodes near the control electrode which receive a supply voltage for the second time (FIG. 4(2)), even within the same pin electrode array. As a result, irregularity of recording density will occur.

In order to improve this situation, the prior art has considered supplying voltage a second time to the same control electrode only after a sufficient time interval. However, it takes a long time to record by this method and it could not be utilized for high-speed recording. So the method as shown in Table 2 was proposed to overcome these problems.

TABLE 2

| Array of Recording Positons | Voltage Impressed Control Electrodes | |
|---|---|---|
| $A_1$ | $P_1$ | $P_2$ |
| $A_2$ | $P_3$ | $P_4$ |
| . | . | . |
| . | . | . |
| . | . | . |
| $A_k$ | $P_{2k-1}$ | $P_{2k}$ |
| . | . | . |
| . | . | . |
| . | . | . |
| $A_n$ | $P_{2n-1}$ | $P_{2n}$ |
| $B_1$ | $P_2$ | $P_3$ |
| $B_2$ | $P_4$ | $P_5$ |
| . | . | . |
| . | . | . |
| . | . | . |
| $B_k$ | $P_{2k}$ | $P_{2k+1}$ |
| . | . | . |
| . | . | . |
| . | . | . |
| $B_n$ | $P_{2n}$ | $P_{2n+1}$ |

In this method, voltages are first supplied to both control electrodes $P_1$ and $P_2$, and then to both control electrodes $P_3$ and $P_4$, and so on, successively to both control electrodes $P_{2k-1}$ and $P_{2k}$ in order to successively record under odd pin electrode arrays $A_1$, $A_2$, . . . , $A_k$, . . . , $A_n$. Then, voltages are first supplied to both control electrodes $P_2$ and $P_3$, and then to both control electrodes $P_4$ and $P_5$, and so on, successvely to both control electrodes $P_{2k}$ and $P_{2k+1}$ in order to successively record under even pin electrode arrays $B_1$, $B_2$, . . . , $B_k$, . . . , $B_n$. According to this method, the above-mentioned problems are improved. However, with this method, voltages $V_n$ are continuously supplied to either pin electrodes $A_1$, $A_2$, . . . , $A_k$, . . . , or pin electrodes $B_1$, $B_2$, . . . , $B_k$, . . . , from pin electrode control circuit $4_a$ or $4_b$. Due to this continuous supply of voltage, a trailing voltage of $V_n$ occurs. This trailing voltage produces a "ghost phenomenon" during recording, so that recording occurs under a pin electrode array which should not be recording. Furthermore, due to the movement of the paper during recording and the time difference between recording by pin electrode array $A_k$ and recording by adjacent pin electrode array $B_k$, the recorded picture is distorted.

In order to eliminate the recording distortion another prior art system was proposed. In this system, pin electrode arrays are separated into four groups: a first group of arrays $A_1$, . . . , $A_k$, . . . ; a second group of arrays $B_1$, . . . , $B_k$, . . . ; a third group of arrays $C_1$, . . . , $C_k$; and a fourth group of arrays $D_1$, . . . , $D_k$, . . . , so that every fourth array is in the same group (A, B, C, or D). The groups are connected to pin electrode driving circuits 4*a*, 4*b*, 4*c*, 4*d*, respectively, as shown in FIG. 5 and are driven in the order shown by Table 3.

TABLE 3

| Array of Recording Positions | Voltage Impressed Control Electrodes | |
|---|---|---|
| $A_1$ | $P_1$ | $P_2$ |
| $C_1$ | $P_3$ | $P_4$ |
| $A_2$ | $P_5$ | $P_6$ |
| $C_2$ | $P_7$ | $P_8$ |
| . | . | . |
| . | . | . |
| . | . | . |
| $B_1$ | $P_2$ | $P_3$ |
| $D_1$ | $P_4$ | $P_5$ |
| $B_2$ | $P_6$ | $P_7$ |
| $D_2$ | $P_8$ | $P_9$ |
| . | . | . |
| . | . | . |
| . | . | . |

In this system in order to alternately record under the electrode arrays of the first and third groups $A_1$, $C_1$, $A_2$, $C_2$, . . . voltages are first supplied to both control electrodes $P_1$ and $P_2$, and then to both control electrodes $P_3$ and $P_4$, and so on, successively to control electrodes $P_{2k-1}$ and $P_{2k}$. In order to alternately record under the electrode arrays of the second and fourth groups $B_1$, $D_1$, $B_2$, $D_2$, . . . , voltages are first supplied to both control electrodes $P_2$ and $P_3$, and then to both control electrodes $P_4$ and $P_5$, and so on, successively to control electrodes $P_{2k}$ and $P_{2k+1}$. According to this technique, occurrence of ghost phenomena are avoided because voltage is not successively supplied to the same pin electrode arrays. However, the use of additional pin electrode driving circuits 4*c*, 4*d* is necessary, and the existence of recorded image distortion remains.

SUMMARY OF THE INVENTION

It is therefore an object of this invention to provide a driving circuit for an electrostatic recording head which prevents non-uniform recording image density without adversely affecting recording time.

It is a further object of the present invention to provide a driving circuit for producing uniform recording density without producing a ghost phenomenon and without increasing the number of pin electrode control circuits.

It is a still further object of the present invention to provide a driving circuit for producing uniform recording density without having recording picture distortion.

It is still another object of this invention to provide a driving circuit for an electrostatic recording head whereby the controlling circuits for controlling the order of supplying the voltages to the control electrodes and for controlling the order of supplying the voltages to the pin electrodes can be easily produced and manufactured without excessive cost.

The instant invention relates to a method and apparatus for driving an electrostatic recording head for recording images on a medium, the recording head comprising a plurality of pin electrodes grouped into alternate even and odd arrays positioned on said recording head ($A_1$, $B_1$, $A_2$, $B_2$ . . . $A_k$, $B_k$ . . . where $A_k$ are odd arrays and $B_k$ are even arrays), a plurality of control electrode, each positioned adjacent one or more associated pin electrodes, each pin electrode array and associated control electrodes, when energized, producing the images, the pin and control electrodes being controlled by separate order control circuits which control the pin electrode arrays and the control electrode arrays for producing the images in the following order alternating between odd and even arrays:

$A_{N+1}$, $B_1$ . . . $A_{2N}$, $B_N$,
$A_1$, $B_{N+1}$, . . . $A_N$, $B_{2N}$,
$A_{3N+1}$, $B_{2N+1}$ . . . $A_{4N}$, $B_{3N}$,
$A_{2N+1}$, $B_{3N+1}$ . . . $A_{3N}$, $B_{4N}$ wherein N is an integer greater than or equal to 2.

Alternatively, the arrays can be driven in the following order alternating between odd and even arrays:

$A_1$, $B_{N+1}$ . . . $A_N$, $B_{2N}$,
$A_{N+1}$, $B_1$, . . . $A_{2N}$, $B_N$,
$A_{2N+1}$, $B_{3N+1}$ . . . $A_{3N}$, $B_{4N}$,
$A_{3N+1}$, $B_{2N+1}$ . . . $A_{4N}$, $B_{3N}$ wherein N is an integer greater than or equal to 2.

DESCRIPTION OF THE PREFERRED EMBODIMENT

Figure 1:
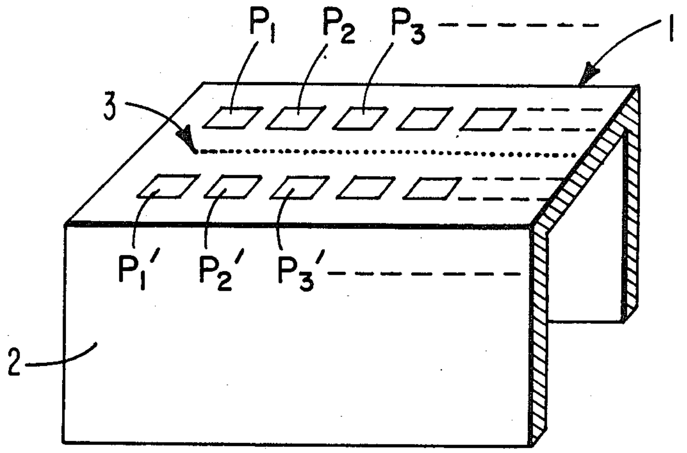
FIG. 1 PRIOR ART
FIG. 1 shows a perspective view of a multistylus recording head having control electrodes on the same plane as the pin electrodes.
Figure 2:
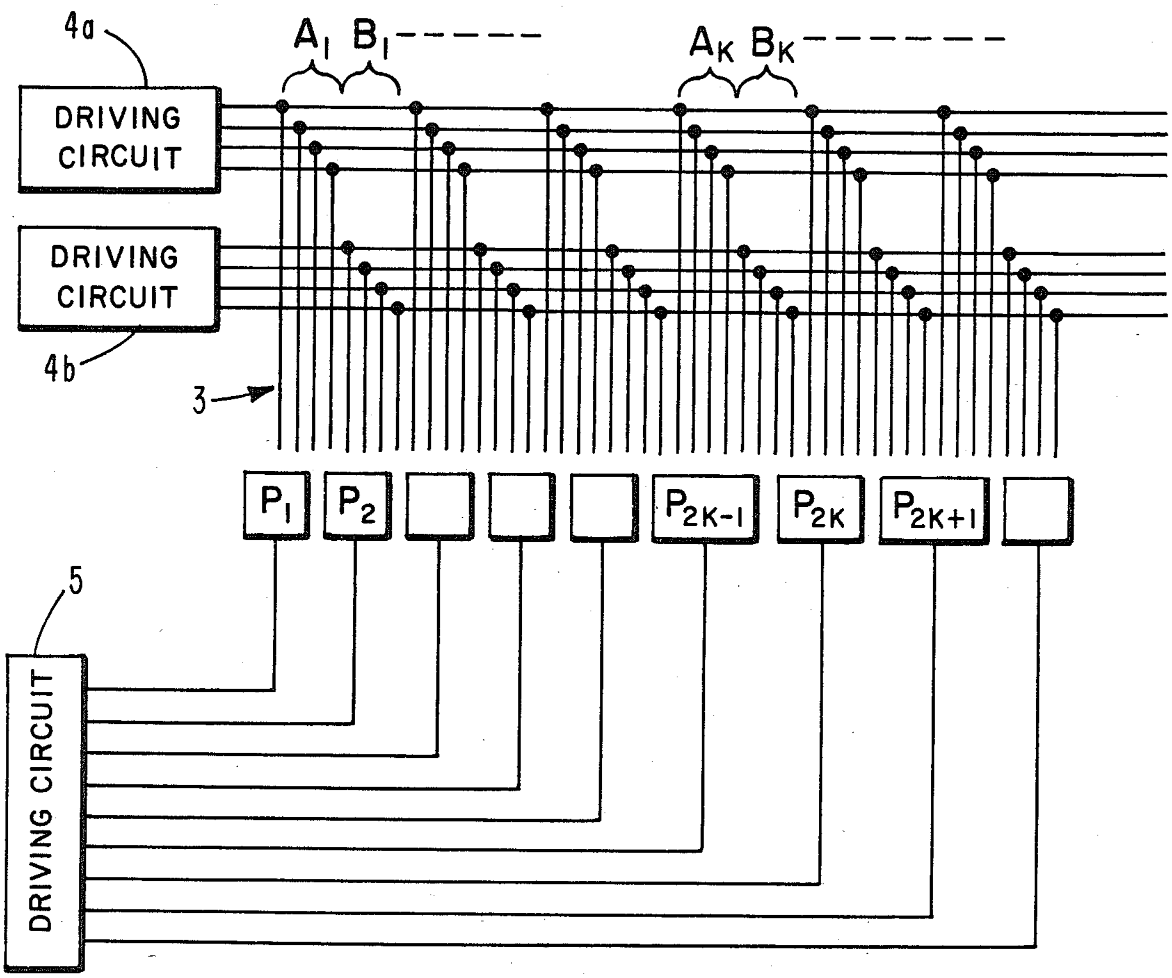
FIG. 2 PRIOR ART
FIG. 2 is a block diagram of a driving circuit for the recording head shown in FIG. 1.
Figure 3:
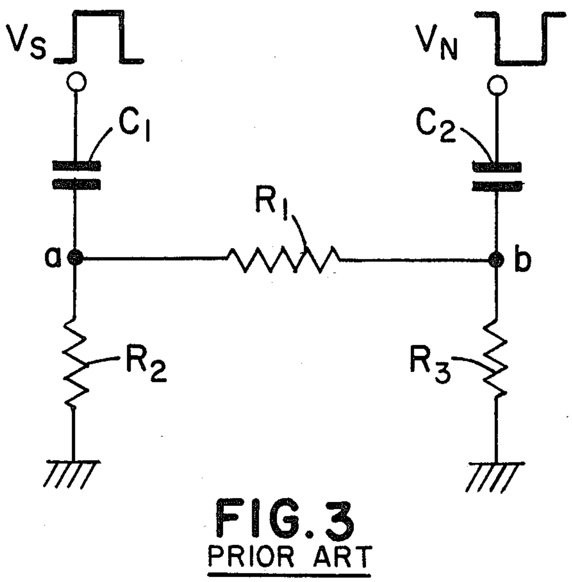
FIG. 3 PRIOR ART
FIG. 3 is an equivalent circuit representing the pin electrode, control electrode and recording medium.
Figure 4:
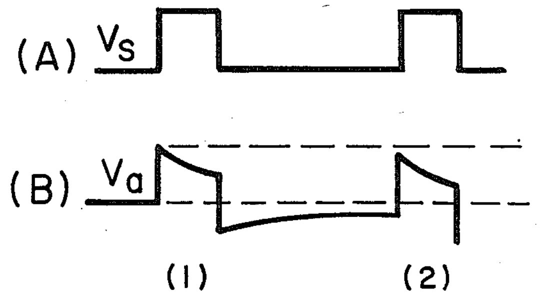
FIG. 4 PRIOR ART
FIG. 4 is a time chart representing the relationship between the voltage supplied to the control electrode ($V_s$) and the voltage ($V_a$) at node a in the circuit of FIG. 3.

Referring now to the drawings, the preferred embodiment will be explained with reference to the circuit shown in FIG. 2. Although this circuit was previously described as conventional with reference to the driving method shown in Tables 1 and 2, its novelty lies in driving it according to the method of Table 4. As shown in FIG. 2, the pin electrodes are separated into sequential even and odd arrays, each array consisting of a plurality of pin electrodes (e.g., four). As shown, the electrodes form pin electrode arrays $A_1$, $B_1$, . . . , $A_k$, $B_k$, . . . . Arrays $A_1$, $A_2$, . . . , $A_k$, . . . , are odd arrays, while arrays $B_1$, $B_2$, . . . , $B_k$, . . . are even arrays. The odd arrays and even arrays are connected, respectively, to pin electrode driving circuits 4a and 4b. Facing pin electrode arrays $A_1$, $B_1$ are control electrodes $P_1$, $P_2$; $P_2$, $P_3$. Facing pin electrodes $A_k$, $B_k$ are control electrodes $P_{2k-1}$, $P_{2k}$; $P_{2k}$, $P_{2k+1}$. The control electrodes are connected to a control electrode driving circuit 5 for energizing the control electrodes associated with the pin electrode array corresponding to the image to be recorded.

TABLE 4

| Array of Recording Positions | Voltage Impressed Control Electrodes | |
|---|---|---|
| $A_5$ | $P_9$ | $P_{10}$ |
| $B_1$ | $P_2$ | $P_3$ |
| $A_6$ | $P_{11}$ | $P_{12}$ |
| $B_2$ | $P_4$ | $P_5$ |
| $A_7$ | $P_{13}$ | $P_{14}$ |
| $B_3$ | $P_6$ | $P_7$ |
| $A_8$ | $P_{15}$ | $P_{16}$ |
| $B_4$ | $P_8$ | $P_9$ |
| $A_1$ | $P_1$ | $P_2$ |
| $B_5$ | $P_{10}$ | $P_{11}$ |
| $A_2$ | $P_3$ | $P_4$ |
| $B_6$ | $P_{12}$ | $P_{13}$ |
| $A_3$ | $P_5$ | $P_6$ |
| $B_7$ | $P_{14}$ | $P_{15}$ |
| . | . | |
| . | . | |
| . | . | |

That is, control voltages are first supplied to control electrodes $P_9$, $P_{10}$ from control driving circuit 5 and driving signals are supplied to the odd arrays from the first pin electrode driving circuit 4a so that array $A_5$ is driven and recording is performed by array $A_5$. Then control voltages are supplied to control electrodes $P_2$, $P_3$ from control electrode driving circuit 5 and driving signals are supplied to the even arrays from the second pin electrode driving circuit 4b. The recording continues in accordance with the order shown in Table 4.

In summary, the pin electrode arrays and the assorted control electrodes are driven so as to produce the images in the following order alternating between odd and even arrays:

$A_{N+1}$, $B_1$ . . . $A_{2N}$, $B_N$,
$A_1$, $B_{N+1}$, . . . $A_N$, $B_{2N}$,
$A_{3N+1}$, $B_{2N+1}$ . . . $A_{4N}$, $B_{3N}$,
$A_{2N+1}$, $B_{3N+1}$ . . . $A_{3N}$, $B_{4N}$ wherein N is an integer greater than or equal to 2.

Accordingly, the time interval between supplying a control voltage to the same control electrode is 6 times or 8 times the recording period of each array. For example, control electrode $P_2$ receives a control voltage during the second recording period and does not receive another control voltage until the 9th record period. Likewise, control electrode $P_3$ receives a control voltage during the second recording period and does not receive another control voltage until the 11th recording period. As a result, the same control electrode does not receive a control voltage until after a sufficient time interval has elapsed so that irregularity in recording density does not occur. The method of Table 1, on the other hand, requires a control voltage to the same control electrode during the next adjacent recording period; consequently, irregularity of recording density occurs.

In addition, the time interval between successively driven arrays is 6 times or 8 times the recording period of each array. For example, the time interval between array $A_5$ driven during the first recording period and array $B_1$ driven during the second recording period is 6 times the recording period of one array. Likewise, the interval between array $B_1$ driven during the second recording period and array $A_6$ driven during the third recording period is 8 times the recording period of one array. Consequently, the successively driven array interval is subsequently short so that the possibility of picture distortion is minimized.

Furthermore, the odd and even arrays of pin electrodes are alternately driven. Consequently, the ghost phenomenon effect does not occur since the same type of array is not successively driven.

The order of driving the arrays and the order of controlling the control electrodes are rather simple so that the order control circuits for controlling the order of activating the control electrodes and the pin electrodes are realized with a simplified circuit configuration.

The pin electrode order control circuit for controlling the order of the voltages to the pin electrodes will be explained with reference to FIG. 6. This circuit comprises a RAM (random access memory) 6 which stores the picture signal to be recorded, and two counters 8, 9 which designate the address for the picture signals written into or read out from RAM 6. The address for each electrode contains upper bits and lower bits. The upper bits designate the array within which the electrode is located and the lower bits designate the particular pin electrode within that array. Counter 9 (upper counter) is an address counter which designates the upper bits of the address and second counter 8 (lower counter) is an address counter which designates the lower bits of the address. Counter 8 is driven by clock pulses CP from an input terminal, and counter 9 is driven by a carry signal CO from an output terminal of second counter 8. AND circuit 7 and exclusive OR circuit 10 are in series between upper counter 9 and RAM 6 and function as an address control circuit. According to the operation of this circuit, the output signals from the upper counter 9 are first supplied to input terminals of RAM 6 and the picture signals are stored therein in the order that they arrive; when the stored picture signals are read out from RAM 6, the order of the odd arrays are output in a different order. The address control circuit is enabled during readout to change the addresses of the odd arrays. That is, the order of the $A_{N+1}$–$A_{2N}$ arrays are exchanged with the $A_1$–$A_N$ arrays. Consequently the $A_{N+1}$–$A_2$ arrays are output before the $A_1$–$A_N$ array. Likewise, the $A_{3N+1}$–$A_{4N}$ arrays are output before the $A_{2N+1}$–$A_{3N}$ arrays, and so on. However, the address control circuit does not affect the address signals of the even group of arrays.

In recording onto a recording medium of size $B_4$ (JIS), 4096 pin electrodes are disposed in to a single line. These pin electrodes are divided into 64 arrays of pin electrodes $A_1$, $B_1$, . . . , each array having 64 pin electrodes. In this case, the number of output bits produced by counter 9 and counter 8 are both 6 bits corresponding to the number of arrays (i.e., 64) and the number of pin electrodes of one array (i.e., 64). When these 64 arrays ($A_1$, $B_1$, $A_2$, $B_2$, . . . ) are alternately selected, arrays $A_1$, $A_2$, . . . form the odd group of arrays and arrays $B_1$, $B_2$, . . . form the even group of arrays. In the case that N is selected as 4 (that is, $N=2^n$, where $n=2$), the $A_{N+1}$ array and the $A_1$ array are separated by 8 arrays (that is $2^{n+1}$, where $n=2$). Accordingly, in order to exchange their addresses, the number 8 must be added to the address number of the $A_1$–$A_N$ arrays, and the number 8 must be subtracted from the address numbers of the $A_{N+1}$–$A_{2N}$ arrays. Likewise, the number 8 must be added to the address number of the $A_{2N+1}$–$A_{3N}$ arays. This operation must likewise be performed for all the remaining sets of arrays within the odd arrays. Therefore, the output signal from counter 9 designates the address number of an odd array (i.e., the output signal from terminal A is "1"), the 4th bit (i.e., $(n+2)$, where $n=2$) from the lowest bit is changed from "1" to "0" or "0" to "1" and that output signal is supplied to RAM 6. The 4th bit from the lowest bit is changed since it corresponds to the number 8 to be substituted or added. For performing this inversion operation of the 4th bit, AND circuit 7 and exclusive OR circuit 10 are utilized. At the time of reading out the picture signals from RAM 6, the relationship between the output signal of upper counter 9 and the input address signal to RAM 6, during the reading out of picture signals from RAM 6, is shown below in Table 5.

TABLE 5

| F E D C | B | A | Decimal Number | F' | E' | D' | C' | B' | A' | Decimal Number |
|---|---|---|---|---|---|---|---|---|---|---|
| 0 0 0 0 | 0 | 0 | 0 | 0 | 0 | 0 | 0 | 0 | 0 | 0 |
| 0 0 0 0 | 0 | 1 | 1 | 0 | 0 | 1 | 0 | 0 | 1 | 9 |
| 0 0 0 0 | 1 | 0 | 2 | 0 | 0 | 0 | 0 | 1 | 0 | 2 |
| 0 0 0 0 | 1 | 1 | 3 | 0 | 0 | 1 | 0 | 1 | 1 | 11 |
| 0 0 0 1 | 0 | 0 | 4 | 0 | 0 | 0 | 1 | 0 | 0 | 4 |
| 0 0 0 1 | 0 | 1 | 5 | 0 | 0 | 1 | 1 | 0 | 1 | 13 |
| 0 0 0 1 | 1 | 0 | 6 | 0 | 0 | 0 | 1 | 1 | 0 | 6 |
| 0 0 0 1 | 1 | 1 | 7 | 0 | 0 | 1 | 1 | 1 | 1 | 15 |
| 0 0 1 0 | 0 | 0 | 8 | 0 | 0 | 1 | 0 | 0 | 0 | 8 |
| 0 0 1 0 | 0 | 1 | 9 | 0 | 0 | 0 | 0 | 0 | 1 | 1 |
| 0 0 1 0 | 1 | 0 | 10 | 0 | 0 | 1 | 0 | 1 | 0 | 10 |
| 0 0 1 0 | 1 | 1 | 11 | 0 | 0 | 0 | 0 | 1 | 1 | 3 |
| . | | | . | | | . | | | | . |
| . | | | . | | | . | | | | . |
| . | | | . | | | . | | | | . |

Figure 6:
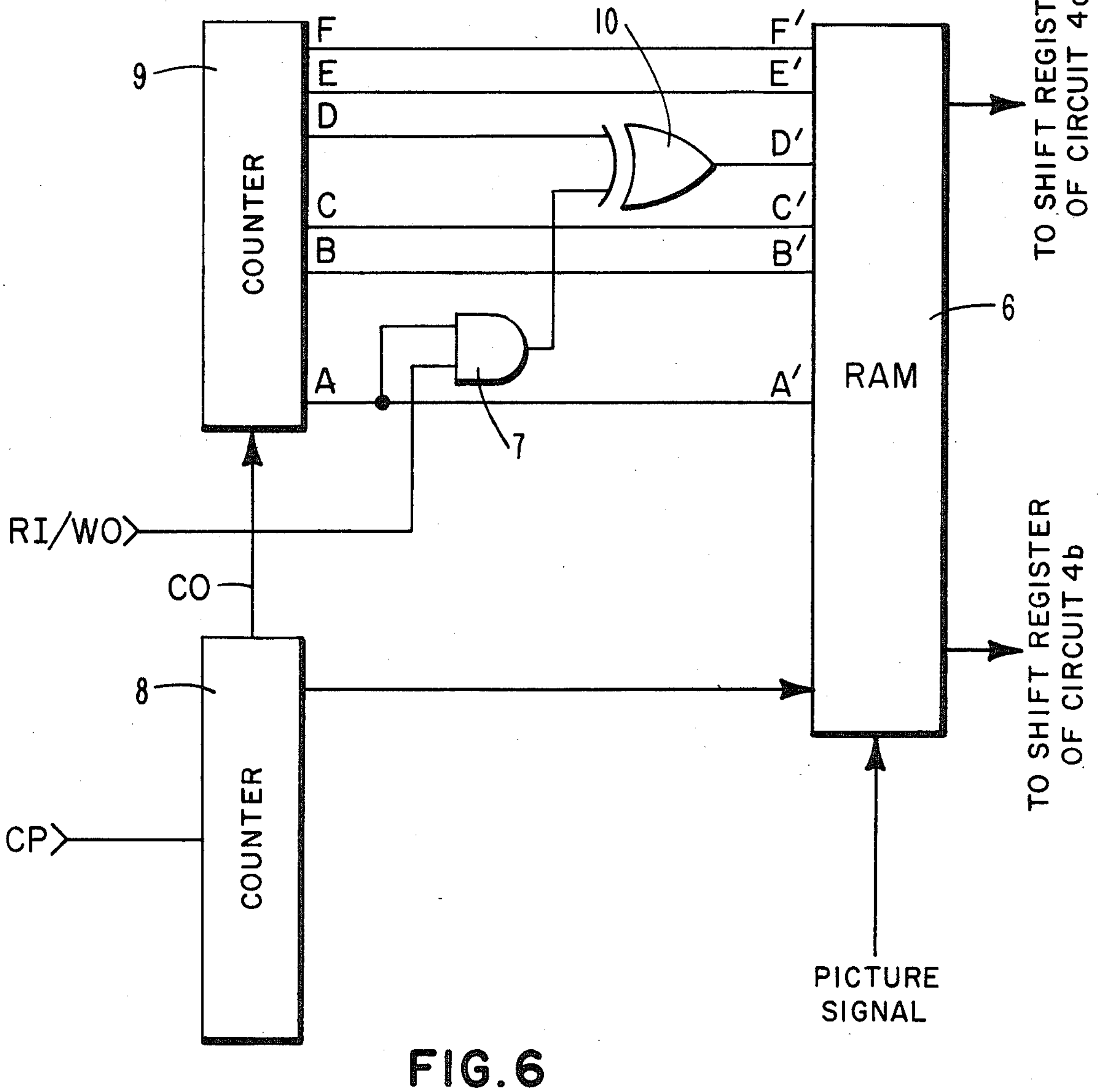
FIG. 6 is a block diagram of a pin electrode order control circuit for controlling the order of the voltages supplied to the pin electrode arrays according to one embodiment of the invention.
Figure 5:
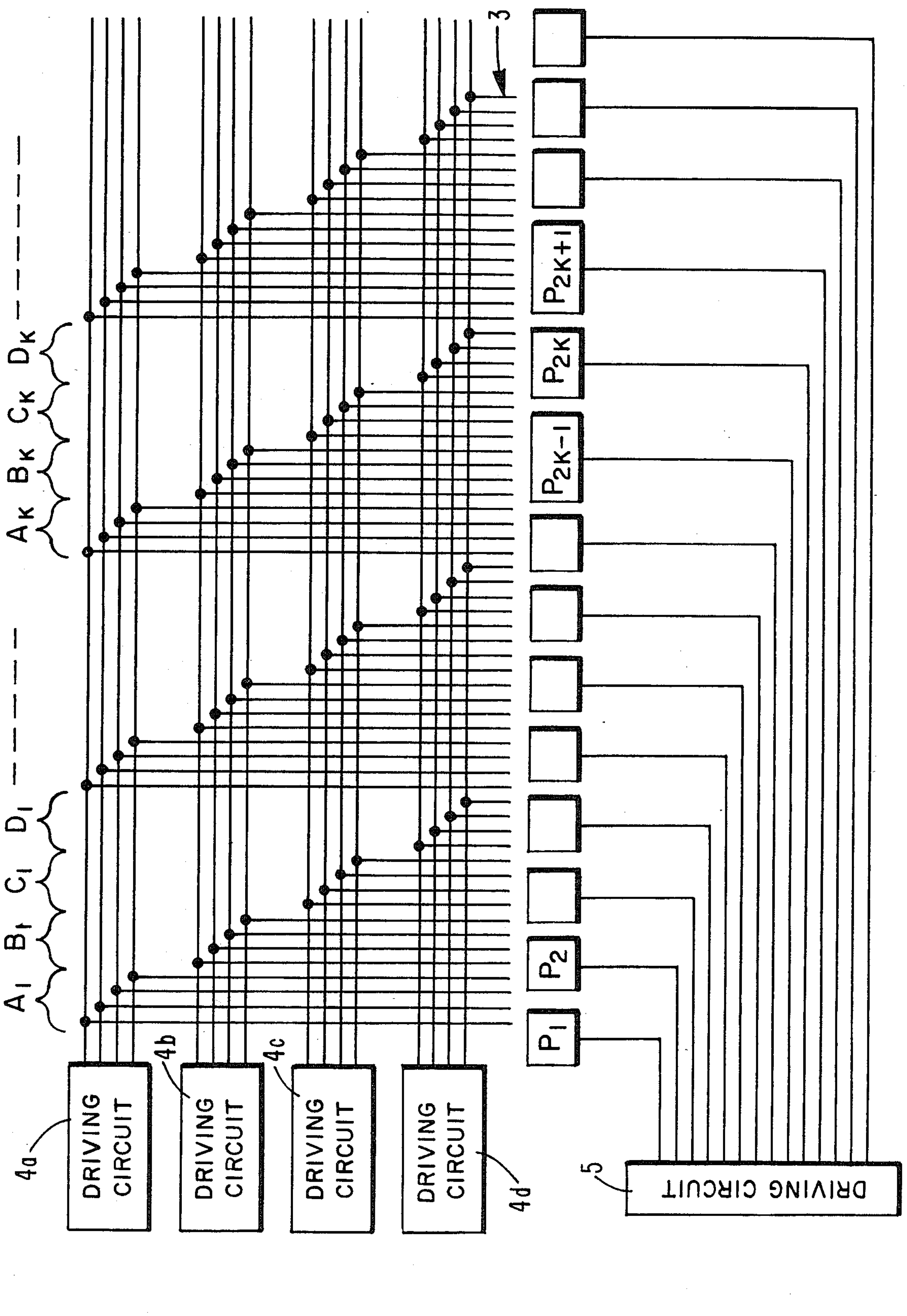
FIG. 5 PRIOR ART
FIG. 5 is a block diagram of a prior art driving circuit.

In the circuit shown as FIG. 6, the picture signals to be recorded are first written in RAM 6, and then are read out. The signals read out for each array from RAM 6 are alternately supplied to a shift register (not shown) of pin electrode driving circuit 4*a* or 4*b*; circuits 4*a* and 4*b* supply the control signal in the desired sequence to each group of arrays. During writing of the picture signals in RAM 6, signal RI/WO to one input terminal of AND circuit 7 is set at "0". For this condition, the output signal of AND circuit 7 is "0"; as a result, exclusive OR circuit 10 transmits the same signal value from the output terminal D of counter 9 to the input terminal D' of RAM 6. Thus, the same output signals appearing at the output terminals A, B, C, D, E, F of counter 9 are supplied to the input terminals of address signals A', B', C', D', E', F' of RAM 6. Accordingly, the picture signals which are successively supplied through the signal line to RAM 6 are stored in the order of their arrival in the memory elements whose addresses are designated by counters 8 and 9.

During reading of picture signals from RAM 6, the signal RI/WO to one input terminal of AND circuit 7 is set at "1". For this condition, only when the lowest bit A of counter 9 is "1" will AND circuit 7 supply a signal "1" to exclusive OR circuit 10. In that event, exclusive OR circuit 10 will invert the value of the signal supplied to its other input terminal. Thus, the output signal from counter 9 and the input address signal to RAM 6 will have the relationship shown in Table 5.

The relationship between the upper 6 bits of each address of RAM 6 and its corresponding arrays of pin electrodes is shown in Table 6.

TABLE 6

| F | E | D | C | B | A | Decimal Number | Array of Pin Electrodes |
|---|---|---|---|---|---|---|---|
| 0 | 0 | 0 | 0 | 0 | 0 | 0 | $B_{32}$ |
| 0 | 0 | 0 | 0 | 0 | 1 | 1 | $A_1$ |
| 0 | 0 | 0 | 0 | 1 | 0 | 2 | $B_1$ |
| 0 | 0 | 0 | 0 | 1 | 1 | 3 | $A_2$ |
| 0 | 0 | 0 | 1 | 0 | 0 | 4 | $B_2$ |
| 0 | 0 | 0 | 1 | 0 | 1 | 5 | $A_3$ |
| 0 | 0 | 0 | 1 | 1 | 0 | 6 | $B_3$ |
| 0 | 0 | 0 | 1 | 1 | 1 | 7 | $A_4$ |
| 0 | 0 | 1 | 0 | 0 | 0 | 8 | $B_4$ |
| 0 | 0 | 1 | 0 | 0 | 1 | 9 | $A_5$ |
| 0 | 0 | 1 | 0 | 1 | 0 | 10 | $B_5$ |
| 0 | 0 | 1 | 0 | 1 | 1 | 11 | $A_6$ |
| | | . | | | | . | . |
| | | . | | | | . | . |
| | | . | | | | . | . |

As shown in Tables 5 and 6, by setting the initial value of the upper counter 9 as "1", the driving signals corresponding to the picture signals for arrays $A_5$, $B_1$, $A_6$, $B_2$, $A_7$ will be read out in that order. That is, the bits "000001" (decimal 1) will be converted by the address control circuit to bits "001001" (Table 5), this corresponds to $A_5$ (Table 6-decimal 9). The next decimal counted will be 2 ("000010"); this value will not be converted by the address control circuit (Table 5). Decimal 2 corresponds to $B_1$ (Table 6). The process continues in that sequence. This order is the same as that shown in Table 4. Accordingly, the control signals can be supplied to the arrays in the order shown in Table 4.

Figure 7:
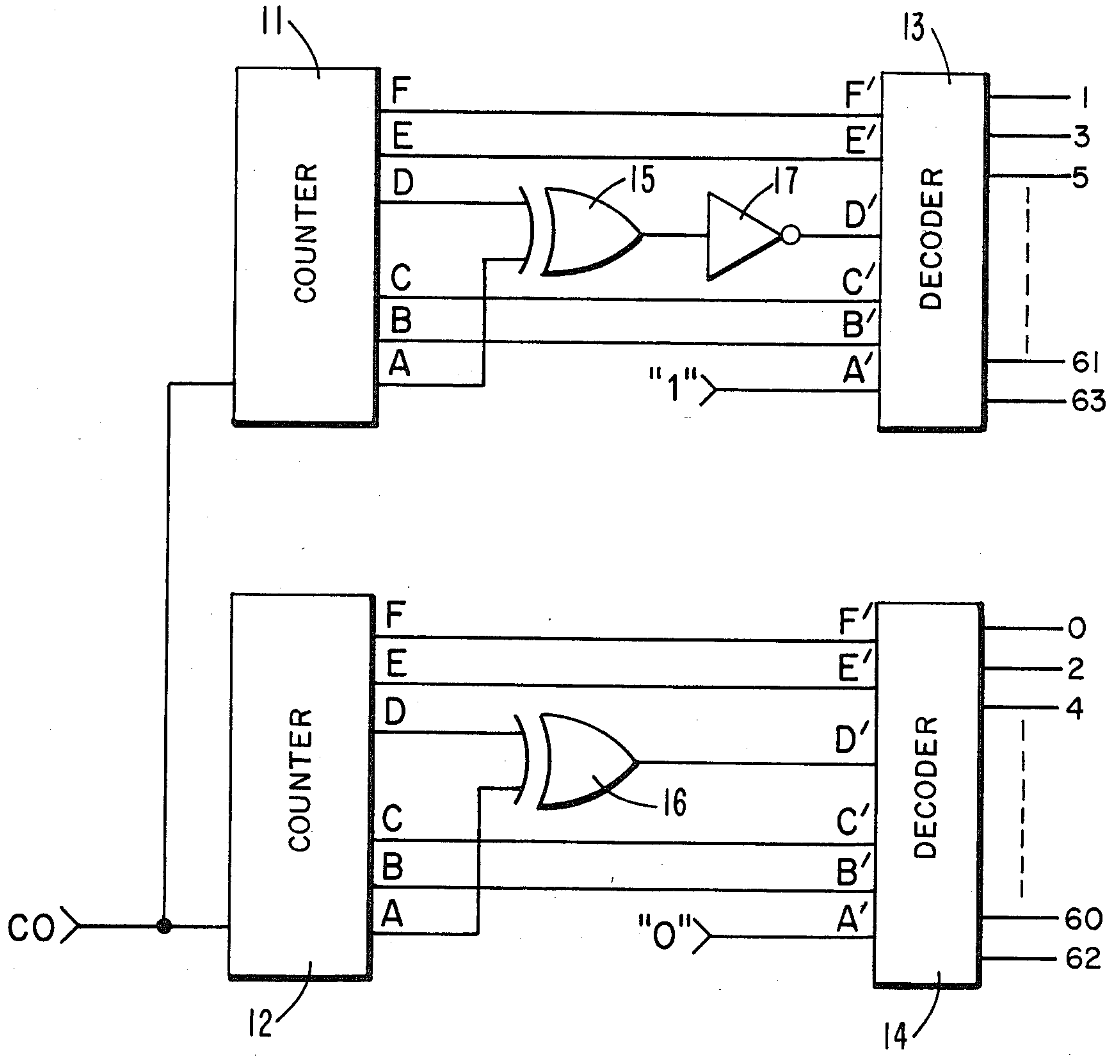
FIG. 7 is a block diagram of a control electrode order circuit for controlling the order of the voltage supplied to the control electrodes according to one embodiment of the invention.

The control electrode order circuit for controlling the order of the signals supplied to the control electrodes will be explained. As shown in FIG. 7, this circuit comprises two counters 11,12 and two decoders 13,14. As mentioned above, the two control electrodes associated with the arrays corresponding to the image to be recorded should also be driven. Counters 11, 12 are driven by the carry signals from counter 8 (FIG. 6). An exclusive OR circuit 15 and inverter 17 are inserted between counter 11 and decoder 13. An additional exclusive OR circuit 16 is inserted between counter 12 and decoder 14. Each exclusive OR circuit forms a decoder control circuit for exchanging the input signals to the decoders. Therefore, the output signal from terminal D of counter 11 is exclusive-ORed with the output signal from terminal A. Likewise, the output signal from terminal D of counter 12 is excluded by the output signal from terminal A.

The lowest bit input terminals of decoder 13 and decoder 14 are supplied signals set at a level "1" and level "0", respectively. The relationship between the output signal from counter 11 and input signal to decoder 13 is shown in Table 7, and the relationship between the output signal from counter 12 and input signal to decoder 14 is shown in Table 8.

TABLE 7

| F E D C | B | A | Decimal Number | F' | E' | D' | C' | B' | A' | Decimal Number |
|---|---|---|---|---|---|---|---|---|---|---|
| 0 0 0 0 | 0 | 0 | 0 | 0 | 0 | 1 | 0 | 0 | 1 | 9 |
| 0 0 0 0 | 0 | 1 | 1 | 0 | 0 | 0 | 0 | 0 | 1 | 1 |
| 0 0 0 0 | 1 | 0 | 2 | 0 | 0 | 1 | 0 | 1 | 1 | 11 |
| 0 0 0 0 | 1 | 1 | 3 | 0 | 0 | 0 | 0 | 1 | 1 | 3 |
| 0 0 0 1 | 0 | 0 | 4 | 0 | 0 | 1 | 1 | 0 | 1 | 13 |
| 0 0 0 1 | 0 | 1 | 5 | 0 | 0 | 0 | 1 | 0 | 1 | 5 |
| 0 0 0 1 | 1 | 0 | 6 | 0 | 0 | 1 | 1 | 1 | 1 | 15 |

TABLE 7-continued

| F E D C | B | A | Decimal Number | F' | E' | D' | C' | B' | A' | Decimal Number |
|---|---|---|---|---|---|---|---|---|---|---|
| 0 0 0 1 | 1 | 1 | 7 | 0 | 0 | 0 | 1 | 1 | 1 | 7 |
| 0 0 1 0 | 0 | 0 | 8 | 0 | 0 | 0 | 0 | 0 | 1 | 1 |
| 0 0 1 0 | 0 | 1 | 9 | 0 | 0 | 1 | 0 | 0 | 1 | 9 |
| 0 0 1 0 | 1 | 0 | 10 | 0 | 0 | 0 | 0 | 1 | 1 | 3 |
| 0 0 1 0 | 1 | 1 | 11 | 0 | 0 | 1 | 0 | 1 | 1 | 11 |
| . | | | . | | | . | | | | . |
| . | | | . | | | . | | | | . |
| . | | | . | | | . | | | | . |
| 1 1 1 1 | 1 | 1 | 63 | 1 | 1 | 1 | 1 | 1 | 1 | 63 |

TABLE 8

| F E D C | B | A | Decimal Number | F' | E' | D' | C' | B' | A' | Decimal Number |
|---|---|---|---|---|---|---|---|---|---|---|
| 0 0 0 0 | 0 | 0 | 0 | 0 | 0 | 0 | 0 | 0 | 0 | 0 |
| 0 0 0 0 | 0 | 1 | 1 | 0 | 0 | 1 | 0 | 0 | 0 | 8 |
| 0 0 0 0 | 1 | 0 | 2 | 0 | 0 | 0 | 0 | 1 | 0 | 2 |
| 0 0 0 0 | 1 | 1 | 3 | 0 | 0 | 1 | 0 | 1 | 0 | 10 |
| 0 0 0 1 | 0 | 0 | 4 | 0 | 0 | 0 | 1 | 0 | 0 | 4 |
| 0 0 0 1 | 0 | 1 | 5 | 0 | 0 | 1 | 1 | 0 | 0 | 12 |
| 0 0 0 1 | 1 | 0 | 6 | 0 | 0 | 0 | 1 | 1 | 0 | 6 |
| 0 0 0 1 | 1 | 1 | 7 | 0 | 0 | 1 | 1 | 1 | 0 | 14 |
| 0 0 1 0 | 0 | 0 | 8 | 0 | 0 | 1 | 0 | 0 | 0 | 8 |
| 0 0 1 0 | 0 | 1 | 9 | 0 | 0 | 0 | 0 | 0 | 0 | 0 |
| 0 0 1 0 | 1 | 0 | 10 | 0 | 0 | 1 | 0 | 1 | 0 | 10 |
| 0 0 1 0 | 1 | 1 | 11 | 0 | 0 | 0 | 0 | 1 | 0 | 2 |
| . | | | . | | | . | | | | . |
| . | | | . | | | . | | | | . |
| . | | | . | | | . | | | | . |

Decoders 13 and 14 decode the input signals supplied to input terminals A'-F' and produce output signals which are supplied to control electrode driving circuit 5. As a result, driving circuit 5 drives the control electrodes according to the output signals of decoders 13, 14. The relationship between the output signals of decoders 13, 14 and the control electrode which receives the control voltage is to be shown as Table 9.

TABLE 9

| Decoder Output Line | Control Electrode |
|---|---|
| 0 | $P_1$, $P_{65}$ |
| 1 | $P_2$ |
| 2 | $P_3$ |
| 3 | $P_4$ |
| 4 | $P_5$ |
| . | . |
| . | . |
| . | . |

By setting the initial value of counters 11 and 12 as "0" and "1" respectively, the signals corresponding to control electrodes $P_{10}$, $P_9$; $P_2$, $P_3$; $P_{12}$, $P_{11}$; . . . are successively supplied from decoders 13, 14; and circuit 5 successively supplies control voltages to the control electrodes $P_9$, $P_{10}$; $P_2$, $P_3$; $P_{11}$, $P_{12}$; . . . .

Accordingly, arrays of pin electrodes are driven and control electrodes receive control voltages in the order shown in Table 4. In the above-mentioned embodiment, the explanation was directed to the case wherein N equals 4. However, in the case that N is a number other than 4 (i.e., $N=2^n$, n is a positive integer), this invention is likewise applicable. The value of N is adequately selected by considering the speed of the recording medium. The exclusive OR circuits of the address control circuit and the decoder control circuits should be coupled to the (n+2)th bit from the lowest bit of the output terminal of counters 9, 11 and 12. For example, if N=2

(i.e., n=1) the exclusive OR circuit should be coupled to the third bit from the lowest bit of the output terminal of counters 9, 11 and 12.

Furthermore, the invention will be applicable in the case N is an integer other than $2^n$ (n: integer); in that case, however, the configuration will be slightly more complex.

Moreover, in the above-mentioned embodiment, the driving order of the odd group of arrays was changed, this invention is also applicable in the case that the driving order of the even group of arrays is changed as, for example:

$A_1, B_{N+1} \ldots A_N, B_{2N},$
$A_{N+1}, B_1, \ldots A_{2N}, B_N,$
$A_{2N+1}, B_{3N+1} \ldots A_{3N}, B_{4N},$
$A_{3N+1}, B_{2N+1} \ldots A_{4N}, B_{3N}$ wherein N is an integer greater than or equal to 2.

In this case, Table 4, Table 6 and Table 9 must be changed as shown below to Table 4′, Table 6′ and Table 9′. Table 5, Table 7 and Table 8 need not be changed. Also, the initial value of upper counter 9 must be changed to "0", and the initial values of counters 11 and 12 must be changed to "63" and "0", respectively.

TABLE 4′

| Array of Recording Positions | Voltage Impressed Control Electrodes | |
|---|---|---|
| $A_1$ | $P_1$ | $P_2$ |
| $B_5$ | $P_{10}$ | $P_{11}$ |
| $A_2$ | $P_3$ | $P_4$ |
| $B_6$ | $P_{12}$ | $P_{13}$ |
| $A_3$ | $P_5$ | $P_6$ |
| $B_7$ | $P_{14}$ | $P_{15}$ |
| $A_4$ | $P_7$ | $P_8$ |
| $B_8$ | $P_{16}$ | $P_{17}$ |
| $A_5$ | $P_9$ | $P_{10}$ |
| $B_1$ | $P_2$ | $P_3$ |
| $A_6$ | $P_{11}$ | $P_{12}$ |
| $B_2$ | $P_4$ | $P_5$ |
| $A_7$ | $P_{13}$ | $P_{14}$ |
| . | . | |
| . | . | |
| . | . | |

TABLE 6′

| F | E | D | C | B | A | Decimal Number | Array of Pin Electrodes |
|---|---|---|---|---|---|---|---|
| 0 | 0 | 0 | 0 | 0 | 0 | 0 | $A_1$ |
| 0 | 0 | 0 | 0 | 0 | 1 | 1 | $B_1$ |
| 0 | 0 | 0 | 0 | 1 | 0 | 2 | $A_2$ |
| 0 | 0 | 0 | 0 | 1 | 1 | 3 | $B_2$ |
| 0 | 0 | 0 | 1 | 0 | 0 | 4 | $A_3$ |
| 0 | 0 | 0 | 1 | 0 | 1 | 5 | $B_3$ |
| 0 | 0 | 0 | 1 | 1 | 0 | 6 | $A_4$ |
| 0 | 0 | 0 | 1 | 1 | 1 | 7 | $B_4$ |
| 0 | 0 | 1 | 0 | 0 | 0 | 8 | $A_5$ |
| 0 | 0 | 1 | 0 | 0 | 1 | 9 | $B_5$ |
| 0 | 0 | 1 | 0 | 1 | 0 | 10 | $A_6$ |
| 0 | 0 | 1 | 0 | 1 | 1 | 11 | $B_6$ |
| | | | . | | | . | . |
| | | | . | | | . | . |
| | | | . | | | . | . |

TABLE 9′

| Decoder Output Line | Control Electrode |
|---|---|
| 63 | $P_1$, $P_{65}$ |
| 0 | $P_2$ |
| 1 | $P_3$ |
| 2 | $P_4$ |
| 3 | $P_5$ |
| 4 | $P_6$ |

TABLE 9′-continued

| Decoder Output Line | Control Electrode |
|---|---|
| . | . |
| . | . |

I claim:

1. A driving circuit for generating control voltages corresponding to a picture image to be recorded by an electrostatic recording head, said driving circuit comprising:
 - a plurality of pin electrodes grouped into a plurality of multi-electrode arrays positioned on the recording head in the order $A_1, B_1, A_2, B_2 \ldots A_k, B_k \ldots$, where A designates an odd array and B designates an even array;
 - first pin electrode control means for supplying to said pin electrodes of said odd arrays control voltages corresponding to the image to be recorded;
 - second pin electrode control means for supplying to said pin electrodes of said even arrays control voltages corresponding to the image to be recorded;
 - a plurality of control electrodes, each positioned adjacent at least one associated pin electrode;
 - control electrode controlling means for supplying to said control electrodes control voltages corresponding to the image to be recorded;
 - a control electrode order circuit for controlling said control electrode controlling means; and
 - a pin electrode order control circuit for controlling said first pin electrode control means and said second pin electrode control means, said pin electrode order control circuit comprising:
   - i. a random access memory (RAM) for storing the recording picture signals;
   - ii. an upper counter and a lower counter for designating addresses for writing said picture signal information or reading said picture signal information from said random access memory; and
   - iii. an address control circuit coupled to said upper counter and said random access memory of said picture signal information in accordance with said recorded image order;
 - said control electrode order circuit and said pin electrode order control circuit comprising order control circuit means for controlling said first pin electrode control means, said second pin electrode control means, and said control electrode controlling means so that the control voltages are supplied to said arrays and said control electrodes in the following order, alternating between odd and even arrays:

$A_{N+1}, B_1 \ldots A_{2N}, B_N,$
$A_1, B_{N+1} \ldots A_N, B_{2N},$
$A_{3N+1}, B_{2N+1} \ldots A_{4N}, B_{3N},$
$A_{2N+1}, B_{3N+1} \ldots A_{3N}, B_{4N},$ where N is an integer greater than or equal to 2.

2. The driving circuit of claim 1 wherein said control electrode order circuit comprises:
 - two electrode order counters which are driven by said lower counter;
 - a first decoder, coupled to one of said electrode order counters, decoding the output of said one counter;
 - a second decoder, coupled to the other of said electrode order counters, for decoding the output of said other counter; and a decoder control means associated with each decoder for controlling the decoding of said counter outputs in accordance with said recorded image order.

3. The driving circuit of claim 2 wherein said address control circuit comprises an exclusive OR circuit connected to the (n+2)th bit from the lowest bit of the output terminals of said upper counter to said RAM (wherein $N=2^n$ and n is a positive integer), and said decoder control means comprises in combination an exclusive OR circuit and a series connected inverter, the input of said exclusive OR circuit connected to the (n+2)th bit from the lowest bit of the output terminals of said one counter and the output terminal of said inverter connected to said first decoder.

4. The driving circuit of claim 3 wherein said decoder control means further comprises an exclusive OR circuit connected to the (n+2)th bit from the lowest bit of the output terminals of said other counter to said second decoder.

5. A driving circuit for generating control voltages corresponding to a picture image to be recorded by an electrostatic recording head, said driving circuit comprising:

a plurality of pin electrodes grouped into a plurality of multi-electrode arrays positioned on the recording head in the order $A_1$, $B_1$, $A_2$, $B_2$, . . . $A_k$, $B_k$ . . . , where A designates an odd array and B designates an even array;

first pin electrode control means for supplying to said pin electrodes of said odd arrays control voltages corresponding to the image to be recorded;

second pin electrode control means for supplying to said pin electrodes of said even arrays control voltages corresponding to the image to be recorded;

a plurality of control electrodes, each positioned adjacent at least one associated pin electrode;

control electrode controlling means for supplying to said control electrodes control voltages corresponding to the image to be recorded;

a control electrode order circuit for controlling said control electrode controlling means; and a pin electrode order control circuit for controlling said first pin electrode control means and said second pin electrode control means, said pin electrode order control circuit comprising:

i. a random access memory (RAM) for storing the recording picture signals;

ii. an upper counter and a lower counter for designating addresses for writing said picture signal information or reading said picture signal information from said random access memory; and iii. an address control circuit coupled to said upper counter and said random accesss memory of said picture signal information in accordance with said recorded image order;

said control electrode order circuit and said pin electrode order control circuit comprising order control circuit means for controlling said first pin electrode control means, said second pin electrode control means, and said control electrode controlling means so that the control voltages are supplied to said arrays and said control electrodes in the following order, alternating between odd and even arrays:

$A_1$, $B_{N+1}$ . . . $A_N$, $B_{2N}$,
$A_{N+1}$, $B_1$, . . . $A_{2N}$, $B_N$,
$A_{2N+1}$, $B_{3N+1}$ . . . $A_{3N}$, $B_{4N}$,
$A_{3N+1}$, $B_{2N+1}$ . . . $A_{4N}$, $B_{3N}$, where N is an integer greater than or equal to 2.

6. The driving circuit of claim 5 wherein said control electrode order circuit comprises:

two electrode order counters which are driven by said lower counter;

a first decoder, coupled to one of said electrode order counters, decoding the output of said one counter;

a second decoder, coupled to the other of said electrode order counters, for decoding the output of said other counter; and a decoder control means associated with each decoder for controlling the decoding of said counter outputs in accordance with said recorded image order.

7. The driving circuit of claim 6 wherein said address control circuit comprises an exclusive OR circuit connected to the (n+2)th bit from the lowest bit of the output terminals of said upper counter to said RAM (wherein $N=2^n$ and n is a positive integer), and said decoder control means comprises in combination an exclusive OR circuit and a series connected inverter, the input of said exclusive OR circuit connected to the (n+2)th bit from the lowest bit of the output terminals of said one counter and the output terminal of said inverter connected to said first decoder.

8. The driving circuit of claim 7 wherein said decoder control means further comprises an exclusive OR circuit connected to the (n+2)th bit from the lowest bit of the output terminals of said other counter to said second decoder.

* * * * *